United States Patent
Miller

(10) Patent No.: US 10,823,598 B2
(45) Date of Patent: Nov. 3, 2020

(54) APPARATUS AND METHOD FOR CREATING INFERENTIAL PROCESS FLOW MEASUREMENTS USING OTHER PROCESS MEASUREMENTS

(71) Applicant: Honeywell International Inc., Morris Plains, NJ (US)

(72) Inventor: Randy M. Miller, Thousand Oaks, CA (US)

(73) Assignee: Honeywell International Inc., Morris Plains, NJ (US)

(*) Notice: Subject to any disclaimer, the term of this patent is extended or adjusted under 35 U.S.C. 154(b) by 360 days.

(21) Appl. No.: 15/825,382

(22) Filed: Nov. 29, 2017

(65) Prior Publication Data

US 2018/0274961 A1 Sep. 27, 2018

Related U.S. Application Data

(60) Provisional application No. 62/475,772, filed on Mar. 23, 2017.

(51) Int. Cl.
*G01F 5/00* (2006.01)
*G01F 1/00* (2006.01)
(Continued)

(52) U.S. Cl.
CPC .............. *G01F 5/005* (2013.01); *G01F 1/007* (2013.01); *G01F 1/363* (2013.01); *G01F 15/063* (2013.01);
(Continued)

(58) Field of Classification Search
None
See application file for complete search history.

(56) References Cited

U.S. PATENT DOCUMENTS 5,298,886 A 3/1994 Ueki et al.
5,419,203 A * 5/1995 Carmichael ............... G01F 1/26
73/861.58

(Continued)

FOREIGN PATENT DOCUMENTS

WO 2017/040100 A1 3/2017

OTHER PUBLICATIONS

International Search Report dated Jul. 10, 2018 in connection with International Patent Application No. PCT/US2018/022824, 3 pages.

(Continued)

*Primary Examiner* — Daniel S Larkin

(57) ABSTRACT

A method includes obtaining actual flow measurements generated by a flow meter, where the actual flow measurements identify a flow of material in a passageway. The method also includes generating estimated flow measurements based on process variable measurements other than the actual flow measurements. The method further includes comparing the estimated flow measurements and the actual flow measurements and determining whether a problem exists based on the comparison. The estimated flow measurements could be generated using one or more models mathematically representing how the flow of material in the passageway relates to non-flow process variables associated with the process variable measurements. The process variable measurements could be obtained from one or more sensors associated with a flow restrictor in the passageway, one or more sensors positioned within the passageway, and/or one or more sensors positioned outside the passageway.

20 Claims, 3 Drawing Sheets

(51) Int. Cl.

| | |
|---|---|
| *G01F 15/06* | (2006.01) |
| *G08B 25/08* | (2006.01) |
| *G01F 1/36* | (2006.01) |
| *G05D 7/06* | (2006.01) |
| *G08B 21/18* | (2006.01) |
| *G01F 25/00* | (2006.01) |
| *G01F 1/56* | (2006.01) |
| *G01F 1/68* | (2006.01) |
| *G01F 1/05* | (2006.01) |
| *G01F 15/00* | (2006.01) |

(52) U.S. Cl.
CPC ....... *G01F 25/0007* (2013.01); *G05D 7/0635* (2013.01); *G08B 21/187* (2013.01); *G08B 25/08* (2013.01); *G01F 1/002* (2013.01); *G01F 1/05* (2013.01); *G01F 1/56* (2013.01); *G01F 1/68* (2013.01); *G01F 15/005* (2013.01)

(56) References Cited

U.S. PATENT DOCUMENTS

| | | | |
|---|---|---|---|
| 2003/0094052 A1* | 5/2003 | Zanker | G01F 1/42 73/861.52 |
| 2007/0034018 A1 | 2/2007 | Bell | |
| 2008/0077335 A1 | 3/2008 | Lee et al. | |
| 2008/0115560 A1 | 5/2008 | Shareef et al. | |

OTHER PUBLICATIONS

Written Opinion of the International Searching Authority dated Jul. 10, 2018 in connection with International Patent Application No. PCT/US2018/022824, 7 pages.
International Search Report dated Jun. 28, 2018 in connection with International Patent Application No. PCT/US2018/022845, 3 pages.
Written Opinion of the International Searching Authority dated Jun. 28, 2018 in connection with International Patent Application No. PCT/US2018/022845, 8 pages.
Miller et al., "Apparatus and Method for Creating Inferential Process Flow Measurements Using Flow Restrictor and Upstream and Downstream Pressure Measurements", U.S. Appl. No. 15/816,169, filed Nov. 17, 2017, 38 pages.
Wikipedia, "Choked Flow", Sep. 2016, 7 pages.
Engineering 360, "Control Valves Information", Jan. 2017, 8 pages.
Industrial Controls, "Controlling Flow with Ball Valves", Dec. 2016, 4 pages.
The Engineering Toolbox, "Flow Coefficients—Cv—and Formulas for Liquids, Steam and Gases—Online Calculators", Jan. 2017, 9 pages.
Process Systems, "Flow Rates for Butterfly Valves—Cv Value", Feb. 2017, 3 pages.
Georgia State University, "Bernoulli Equation", Nov. 2016, 6 pages.
"Applications of the Bernoulli Equation", Nov. 19, 2016, 12 pages.
"Specifying Control Valve Data", Mar. 15, 2017, 6 pages.

* cited by examiner

APPARATUS AND METHOD FOR CREATING INFERENTIAL PROCESS FLOW MEASUREMENTS USING OTHER PROCESS MEASUREMENTS

CROSS-REFERENCE TO RELATED APPLICATION AND PRIORITY CLAIM

This application claims priority under 35 U.S.C. § 119(e) to U.S. Provisional Patent Application No. 62/475,772 filed on Mar. 23, 2017. This provisional application is hereby incorporated by reference in its entirety.

TECHNICAL FIELD

This disclosure generally relates to measuring fluid flows in industrial process control and automation systems or other systems. More specifically, this disclosure relates to an apparatus and method for creating inferential process flow measurements using other process measurements.

BACKGROUND

Flow meters are used in a variety of industries to measure the flows of materials through pipes or other structures. For example, hundreds or thousands of flow meters could be used to measure the flows of materials in oil and gas refineries, chemical plants, or other large industrial facilities. Among other things, measurements from flow meters can be used to help control industrial processes, ensure safety of personnel, and prevent discharge of materials into the surrounding environment. The failure of a flow meter can cause disruptions in an industrial process, lead to the creation of safety issues, or allow environmental damage.

SUMMARY

This disclosure provides an apparatus and method for creating inferential process flow measurements using other process measurements.

In a first embodiment, a method includes obtaining actual flow measurements generated by a flow meter, where the actual flow measurements identify a flow of material in a passageway. The method also includes generating estimated flow measurements based on process variable measurements other than the actual flow measurements. The method further includes comparing the estimated flow measurements and the actual flow measurements and determining whether a problem exists based on the comparison.

In a second embodiment, an apparatus includes at least one processing device configured to obtain actual flow measurements generated by a flow meter, where the actual flow measurements identify a flow of material in a passageway. The at least one processing device is also configured to generate estimated flow measurements based on process variable measurements other than the actual flow measurements. The at least one processing device is further configured to compare the estimated flow measurements and the actual flow measurements and determine whether a problem exists based on the comparison.

In a third embodiment, a non-transitory computer readable medium contains instructions that when executed cause at least one processing device to obtain actual flow measurements generated by a flow meter, where the actual flow measurements identify a flow of material in a passageway. The medium also contains instructions that when executed cause the at least one processing device to generate estimated flow measurements based on process variable measurements other than the actual flow measurements. The medium further contains instructions that when executed cause the at least one processing device to compare the estimated flow measurements and the actual flow measurements and determine whether a problem exists based on the comparison.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
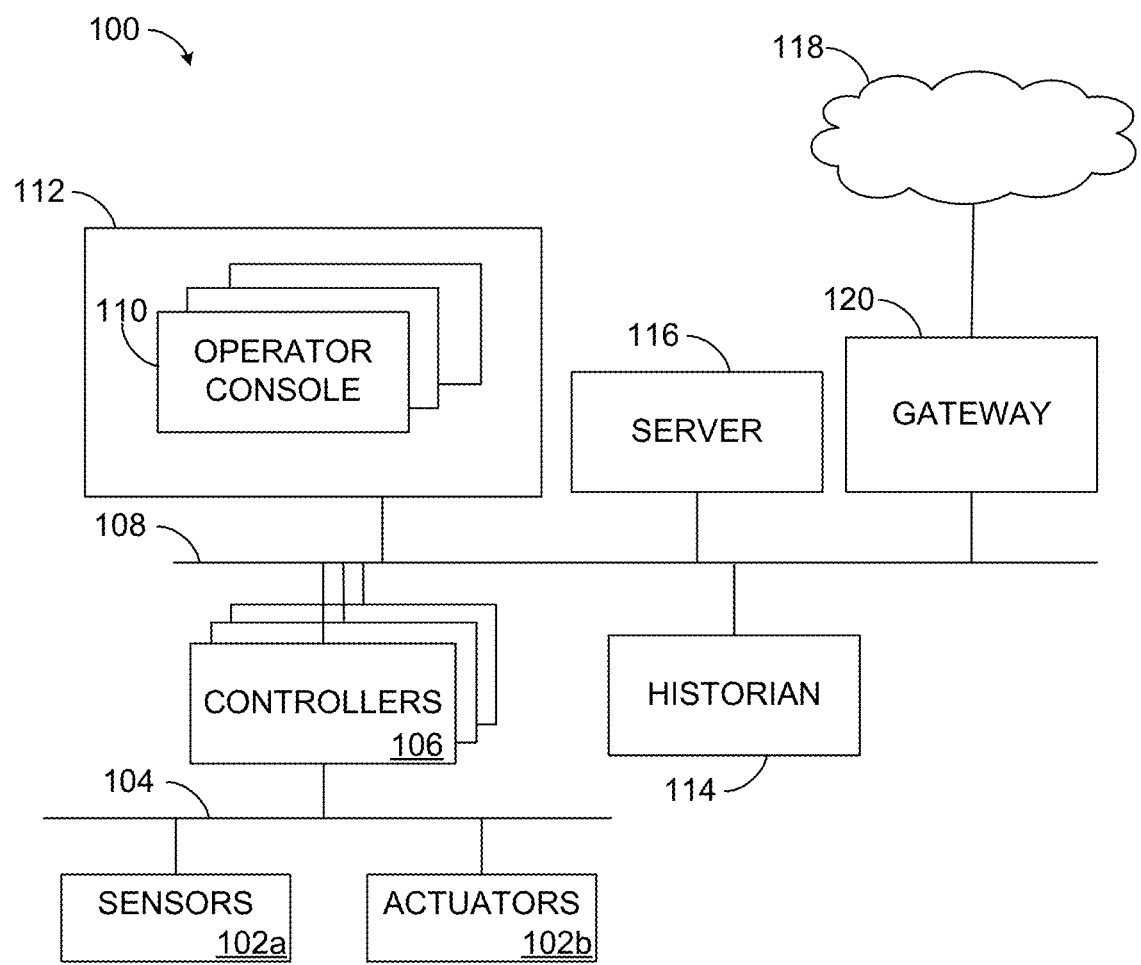
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as flow, pressure, or temperature. Also, the actuators 102b could alter a wide variety of characteristics in the process system, such as valve openings. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent at least one Ethernet network (such as one supporting a FOUNDATION FIELDBUS protocol), electrical signal network (such as a HART network), pneumatic control signal network, or any other or additional type(s) of network(s).

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. A second set of controllers 106 could be used to optimize the control logic or other operations performed by the first set of controllers. A third set of controllers 106 could be used to perform additional functions. The controllers 106 could therefore support a combination of approaches, such as regulatory control, advanced regulatory control, supervisory control, and advanced process control.

Each controller 106 includes any suitable structure for controlling one or more aspects of an industrial process. At least some of the controllers 106 could, for example, represent proportional-integral-derivative (PID) controllers or multivariable controllers, such as controllers implementing model predictive control or other advanced predictive control. As a particular example, each controller 106 could represent a computing device running a real-time operating system, a WINDOWS operating system, or other operating system.

At least one network 108 couples the controllers 106 and other devices in the system 100. The network 108 facilitates the transport of information between components. The network 108 could represent any suitable network or combination of networks. As particular examples, the network 108 could represent at least one Ethernet network.

Operator access to and interaction with the controllers 106 and other components of the system 100 can occur via various operator consoles 110. Each operator console 110 could be used to provide information to an operator and receive information from an operator. For example, each operator console 110 could provide information identifying a current state of an industrial process to the operator, such as values of various process variables and warnings, alarms, or other states associated with the industrial process. Each operator console 110 could also receive information affecting how the industrial process is controlled, such as by receiving setpoints or control modes for process variables controlled by the controllers 106 or other information that alters or affects how the controllers 106 control the industrial process. Each operator console 110 includes any suitable structure for displaying information to and interacting with an operator. For example, each operator console 110 could represent a computing device running a WINDOWS operating system or other operating system.

Multiple operator consoles 110 can be grouped together and used in one or more control rooms 112. Each control room 112 could include any number of operator consoles 110 in any suitable arrangement. In some embodiments, multiple control rooms 112 can be used to control an industrial plant, such as when each control room 112 contains operator consoles 110 used to manage a discrete part of the industrial plant.

The control and automation system 100 here also includes at least one historian 114 and one or more servers 116. The historian 114 represents a component that stores various information about the system 100. The historian 114 could, for instance, store information that is generated by the various controllers 106 during the control of one or more industrial processes. The historian 114 includes any suitable structure for storing and facilitating retrieval of information. Although shown as a single component here, the historian 114 could be located elsewhere in the system 100, or multiple historians could be distributed in different locations in the system 100.

Each server 116 denotes a computing device that executes applications for users of the operator consoles 110 or other applications. The applications could be used to support various functions for the operator consoles 110, the controllers 106, or other components of the system 100. Each server 116 could represent a computing device running a WINDOWS operating system or other operating system. Note that while shown as being local within the control and automation system 100, the functionality of the server 116 could be remote from the control and automation system 100. For instance, the functionality of the server 116 could be implemented in a computing cloud 118 or a remote server communicatively coupled to the control and automation system 100 via a gateway 120.

The sensors 102a in FIG. 1 include at least one flow meter that captures measurements of material flowing through a pipe, valve, or other flow restrictor or other structure. As noted above, the failure of a flow meter can cause various problems, such as disruptions in an industrial process, safety issues, or environmental damage.

In accordance with this disclosure, one or more other process variable measurements can be correlated with the flow of material through the structure, and the other process variable measurements can be used to verify whether the flow meter or other components are operating correctly. For example, a controller 106, operator console 110, server 116, or computing cloud 118 could use one or more models associating the flow of material through the structure with one or more other process variables. Measurements associated with the one or more other process variables can be obtained and used to estimate the flow of material through the structure. The actual flow measurements generated by the flow meter could be compared with the estimated flow measurements to determine whether a problem exists.

In this way, a flow meter can have a digital "twin" that is used to help validate the flow measurements from the flow meter. If the flow meter begins to experience a problem, the existence of the problem could be identified. It is also possible that the flow meter could be operating correctly and that another component (such as one or more sensors for the other process variable measurements) could be suffering from a problem. It is further possible that a model or other parameter(s) of the flow estimation algorithm need to be recalculated, tuned, or otherwise updated so that the flow estimation algorithm functions more accurately. In any case, any suitable corrective action(s) could occur, such as generating a warning or alarm or scheduling maintenance. If the flow meter fails, the digital twin of the flow meter can be used until the flow meter is replaced or repaired.

This approach can therefore help to reduce disruptions in an industrial process, safety issues, and environmental damage. Moreover, this approach could be replicated for some or all of the flow meters associated with one or more industrial processes. For example, this approach could be used for all critical flow meters in an industrial process or for all flow meters in an industrial process. Additional details regarding this approach are provided below.

As a particular application example, this approach can be used to estimate flow measurements that are required for environmental reporting. This approach allows for the creation of a "one out of two" diagnostic (1oo2D) voting capability for flow measurements without requiring additional instruments. The primary measurements could come from the flow meter, and the secondary measurements could be estimated using other process variable data. A user can be alerted when a mismatch between the measurements exceeds a threshold, and the user may choose to use either the primary measurements or the secondary measurements while investigating the cause of the difference. Another example application can include use in custody transfer metering where oil or other material is transferred between parties. The estimated flow measurements could be used as an indicator of gross error in a flow meter's actual measurements. Still other applications could include use with key plant balance flow meters and flow meters used as inputs for advanced control or optimization.

It should be noted that various types of flow meters could be used here and have their measurements validated using one or more other process variable measurements. Example flow meters could include mechanical, pressure-based, optical, open-channel, thermal mass, vortex, sonar, electromagnetic, ultrasonic, Coriolis, or laser Doppler flow meters. It should also be noted that, if a flow restrictor is used with the flow meter or the other process variable measurements, the flow restrictor could be separate from the flow meter or form a part of the flow meter being validated. If a flow restrictor is used with the flow meter or the other process variable measurements, any suitable flow restrictor could be used here. Example flow restrictors could include one or more valves, flow orifices, orifice plates, or pipe fittings or any combination thereof. In general, a "flow restrictor" refers to any device or combination of devices that provides flow restriction for fluid in a passageway. It should further be noted that a wide variety of other process variable measurements could be used to validate the measurements from a flow meter. Example types of process variable measurements that could be used include pressure, temperature, level, speed, or other mechanical, electrical, or other measurements.

Although FIG. 1 illustrates one example of an industrial process control and automation system 100, various changes may be made to FIG. 1. For example, the system 100 could include any number of sensors, actuators, controllers, networks, operator stations, control rooms, historians, servers, and other components. Also, the makeup and arrangement of the system 100 in FIG. 1 is for illustration only. Components could be added, omitted, combined, further subdivided, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates one example operational environment where at least one flow meter can be monitored. This functionality can be used in any other suitable system, and that system need not be used for industrial process control and automation.

Figure 2:
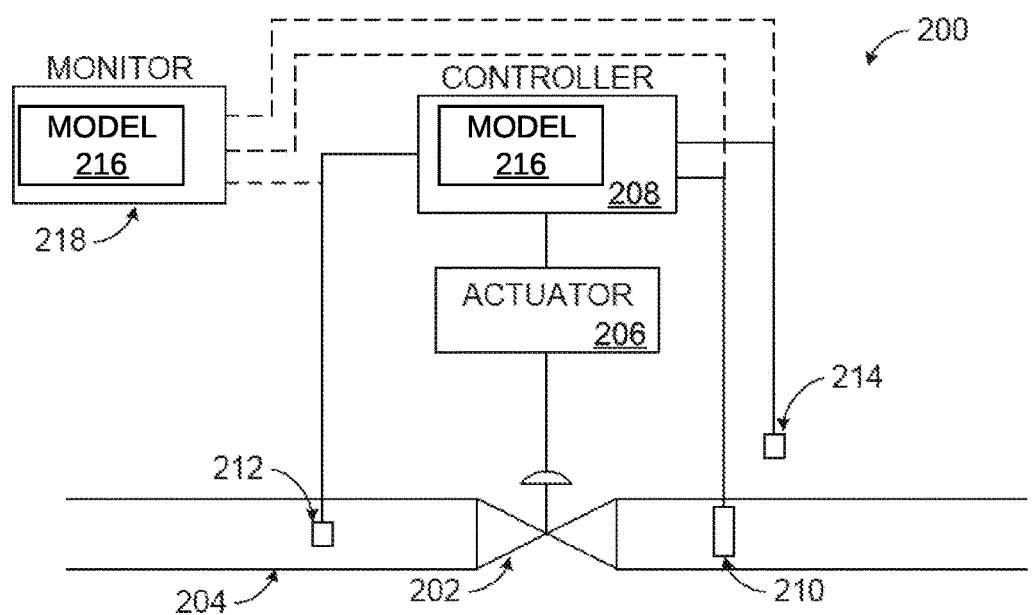
FIG. 2 illustrates an example system supporting inferential process flow measurements using other process measurements according to this disclosure.

FIG. 2 illustrates an example system 200 supporting inferential process flow measurements using other process measurements according to this disclosure. For ease of explanation, the system 200 may be described as being used within the industrial process control and automation system 100 of FIG. 1. However, the system 200 could be used for any other suitable function, and the system 200 need not relate to industrial process control and automation.

As shown in FIG. 2, the system 200 includes a flow restrictor, which in this example denotes a valve 202, positioned within or otherwise associated with a pipe 204. The valve 202 denotes any suitable structure configured to control the flow of material. The pipe 204 denotes any suitable structure configured to transport material. The material could include any suitable fluid, such as one or more liquids or gases. The system 200 also includes an actuator 206, which can alter the setting (opening or position) of the valve 202 in order to alter the flow of material through the pipe 204. The actuator 206 includes any suitable structure for altering a valve or other structure in order to adjust a flow of material. A controller 208 processes input data and generates control signals for the actuator 206. The controller 208 therefore operates to control the actuator 206 (and indirectly the valve 202) in order to control the flow of material through the pipe 204. The controller 208 includes any suitable structure for generating control signals for an actuator in order to control a flow of material.

The system 200 also includes various sensors 210-214. The sensor 210 denotes a flow meter that is configured to measure a flow of material through the pipe 204. The sensor 210 is disposed in the same flow path as the valve 202 with no additions or deviations for fluid between the valve 202 and the sensor 210. The sensor 210 can therefore generate measurements of the material flowing through the valve 202. The sensor 210 includes any suitable structure for measuring a flow of material, such as one or more mechanical, pressure-based, optical, open-channel, thermal mass, vortex, sonar, electromagnetic, ultrasonic, Coriolis, or laser Doppler flow meters.

The sensors 212 and 214 denote other sensors configured to measure other process variables in the system 200. For example, one or more sensors 212 could measure any suitable process variable(s) within the pipe 204, such as temperature, pressure, composition, or other value(s). One or more sensors 214 could measure any suitable process variable(s) outside the pipe 204, such as one or more process variables associated with one or more other portions of an industrial process that interact with or affect the flow of material within the pipe 204.

Note that the number and positioning of the sensors 212 and 214 in FIG. 2 are for illustration only and that other numbers or positions of sensors could be used. For example, sensors 212 could be positioned both upstream and downstream from the valve 202. As a particular example, pressure sensors 212 could be located at the inlet and at the outlet of the valve 202 or otherwise upstream and downstream from the valve 202. Also, the sensors 214 could be placed in any suitable locations outside the pipe 204.

The measurements from the sensor 210 are provided to the controller 208. The controller 208 uses the measurements from the sensor 210 to control the operation of the actuator 206. For example, the controller 208 could use the measurements from the sensor 210 to determine whether an actual flow of material through the pipe 204 is at a desired setpoint, is too high (above the setpoint), or is too low (below the setpoint). The controller 208 could then control the actuator 206 in order to adjust the valve 202 and change the flow rate through the pipe 204 if needed.

In some embodiments, the measurements from the sensors 212 and 214 are also provided to the controller 208. The controller 208 can use the measurements from the sensors 212 and 214 along with at least one model 216 to estimate what the flow measurements from the sensor 210 should be. If the estimated flow measurements are different from the actual flow measurements (such as by a threshold amount or percentage for a specified amount of time), this could be indicative of a problem (such as with the sensor 210 or other component), and the controller 208 may generate a warning or alarm or take other suitable action. If the sensor 210 actually fails, the controller 208 could use the estimated flow measurements until the sensor 210 is repaired or replaced.

In general, industrial processes are typically associated with a number of process variables, which can include controlled, manipulated, and disturbance variables. A controlled variable generally denotes a variable whose value can be measured or inferred and that is controlled to be at or near a desired setpoint or within a desired range. A manipulated variable generally denotes a variable that can be altered in order to adjust one or more controlled variables. A disturbance variable generally denotes a variable whose value can be considered but not controlled when determining how to adjust one or more manipulated variables to achieve desired changes to one or more controlled variables. A model 216 could mathematically define how a controlled variable behaves based on changes to a manipulated or disturbance variable.

The model(s) 216 could mathematically define a modeled behavior of one or more process variables in an industrial process. Ideally, the modeled behavior of a model perfectly represents the actual behavior of one or more process variables in an industrial process, although in reality there is typically some error in the representation. In this example, each model 216 can mathematically represent how the flow of material through the valve 202, pipe 204, or other structure relates to another process variable measured by the sensor 212 or 214. Of course, if a structure is used without a valve or other flow restrictor, each model 216 can mathematically represent how the flow of material through that structure relates to another process variable measured by the sensor 212 or 214. Thus, the controller 208 can use measurements of one or more other process variables with the model(s) 216 to estimate the flow through the valve 202 or other structure.

Note that this functionality could also be implemented in other ways. For example, the measurements from the sensors 210-214 could be provided to an external monitor 218 (which could denote a local or remote server 116 or a remote computing cloud 118). The external monitor 218 could use the model(s) 216 and the measurements from the sensors 210-214 to verify proper operation of the sensor 210 and other components. If a problem is detected, a notification identifying the issue could be sent to one or more users, such as for display on one or more operator consoles 110. As another example, the measurements from the sensors 212 and 214 could be provided to the external monitor 218, and the external monitor 218 could use the model(s) 216 and the measurements from the sensors 212 and 214 to estimate flow measurements through the valve 202 or other structure. The estimated flow measurements could then be provided to one or more operator consoles 110, the server 116, or other destination(s) for comparison to the actual flow measurements obtained from the sensor 210.

Also note that while a valve 202 is shown as being used here in a pipe 204, this is not required. For example, the pipe 204 could include another type of flow restrictor that restricts the flow of fluid through the pipe 204. A flow restrictor generally refers to any structure having a fixed or variable opening that is narrower than a surrounding structure. As a result, fluid flowing through a surrounding structure enters the narrower opening, creating a change in the fluid's pressure and velocity. Other types of flow restrictors could include flow orifices, orifice plates, or pipe fittings. It is also possible that the pipe 204 does not include any flow restrictor, where the other pressure variable measurements are capable of being used to identify estimate flow through the pipe 204. When a fixed flow restrictor or no flow restrictor is used, there is likely no need for an actuator 206 since there is no amount of restriction to be altered. In that case, the controller 208 need not be used to control the actuator 206, although the controller 208 could still be used to calculate estimated flow measurements and to compare actual and estimated flow measurements.

Further, note that this approach can be used with any suitable structure having a passageway for fluid to flow. As examples, the passageway can take the form of a pipe, tube, or other elongated structure. As other examples, the passageway can also take the form of a path through a manifold or other structure.

In addition, note that the use of mathematical models 216 denotes one way that estimated flow measurements could be generated based on measurements of one or more other process variables. Other approaches could also be used. For example, a neural network could be used to associate one or more other process variables with the flow of material through the valve 202 or other structure. In this approach, the relationship between the flow and the other process variable(s) could be defined based on the neural units and their interconnections in the neural network, rather than on one or more mathematical expressions.

Although FIG. 2 illustrates one example of a system 200 supporting inferential process flow measurements using upstream and downstream pressure measurements, various changes may be made to FIG. 2. For example, the system 200 shown here could be used to monitor any number of flow meters. Also, the functionality for monitoring the operation of one or more flow meters could be implemented in any other suitable manner. In addition, the flow meter 210 could be placed on either side of the valve 202 or in another location as long as the flow meter 210 can measure the amount of material flowing through the pipe 204.

Figure 3:
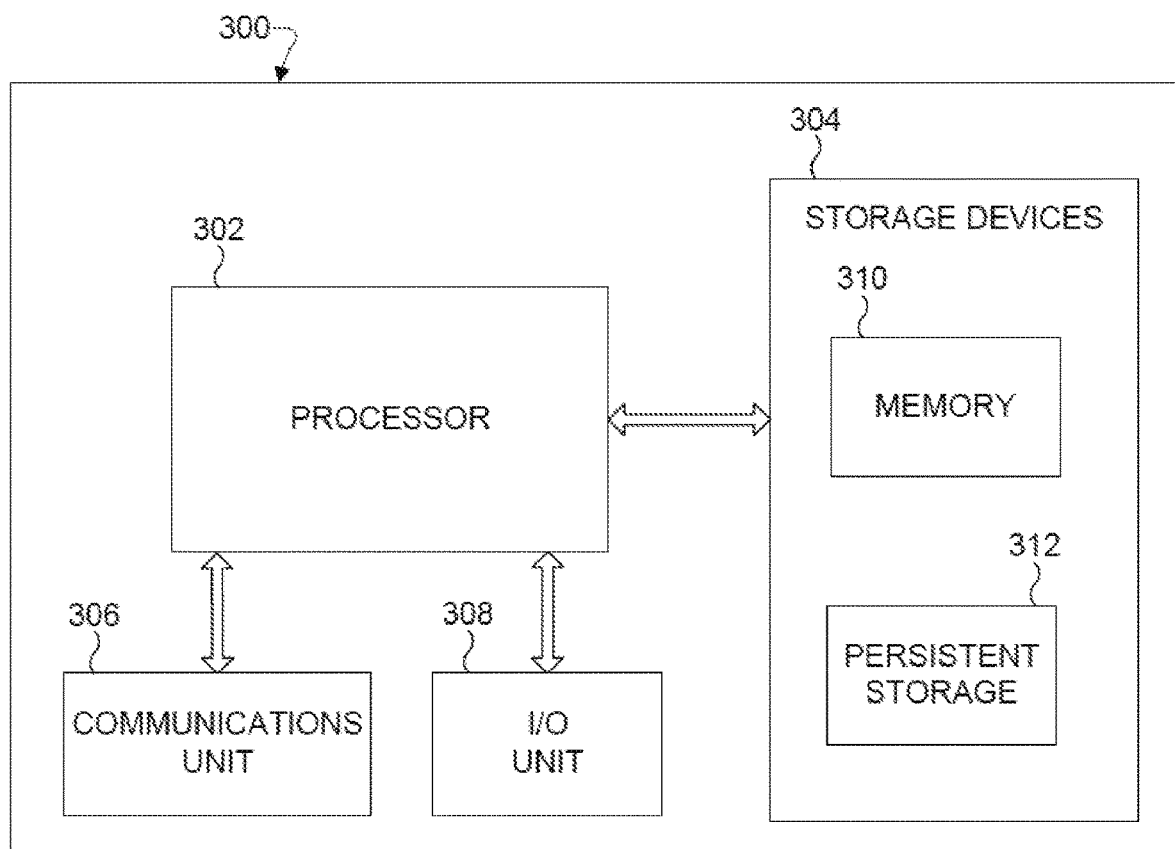
FIG. 3 illustrates an example device for creating inferential process flow measurements using other process measurements according to this disclosure.

FIG. 3 illustrates an example device 300 for creating inferential process flow measurements using other process measurements according to this disclosure. The device 300 could, for example, denote any of the components 106, 110, 116, 208, 218 described above with respect to FIGS. 1 and 2. However, the device 300 could be used in any other suitable system.

As shown in FIG. 3, the device 300 includes at least one processor 302, at least one storage device 304, at least one communications unit 306, and at least one input/output (I/O) unit 308. Each processor 302 can execute instructions, such as those that may be loaded into a memory 310. The instructions could implement the flow meter monitoring functionality described in this patent document. Each processor 302 denotes any suitable processing device, such as one or more microprocessors, microcontrollers, digital signal processors, application specific integrated circuits (ASICs), field programmable gate arrays (FPGAs), or discrete circuitry.

The memory 310 and a persistent storage 312 are examples of storage devices 304, which represent any structure(s) capable of storing and facilitating retrieval of information (such as data, program code, and/or other suitable information on a temporary or permanent basis). The memory 310 may represent a random access memory or any other suitable volatile or non-volatile storage device(s). The persistent storage 312 may contain one or more components or devices supporting longer-term storage of data, such as a read only memory, hard drive, Flash memory, or optical disc.

The communications unit 306 supports communications with other systems or devices. For example, the communications unit 306 could include a network interface card or a wireless transceiver facilitating communications over a wired or wireless network. The communications unit 306 may support communications through any suitable physical or wireless communication link(s).

The I/O unit 308 allows for input and output of data. For example, the I/O unit 308 may provide a connection for user input through a keyboard, mouse, keypad, touchscreen, or other suitable input device. The I/O unit 308 may also send output to a display, printer, or other suitable output device.

Although FIG. 3 illustrates one example of a device 300 for creating inferential process flow measurements using upstream/downstream pressure measurements, various changes may be made to FIG. 3. For example, components could be added, omitted, combined, further subdivided, or placed in any other suitable configuration according to particular needs. Also, computing devices can come in a wide variety of configurations, and FIG. 3 does not limit this disclosure to any particular configuration of computing device.

Figure 4:
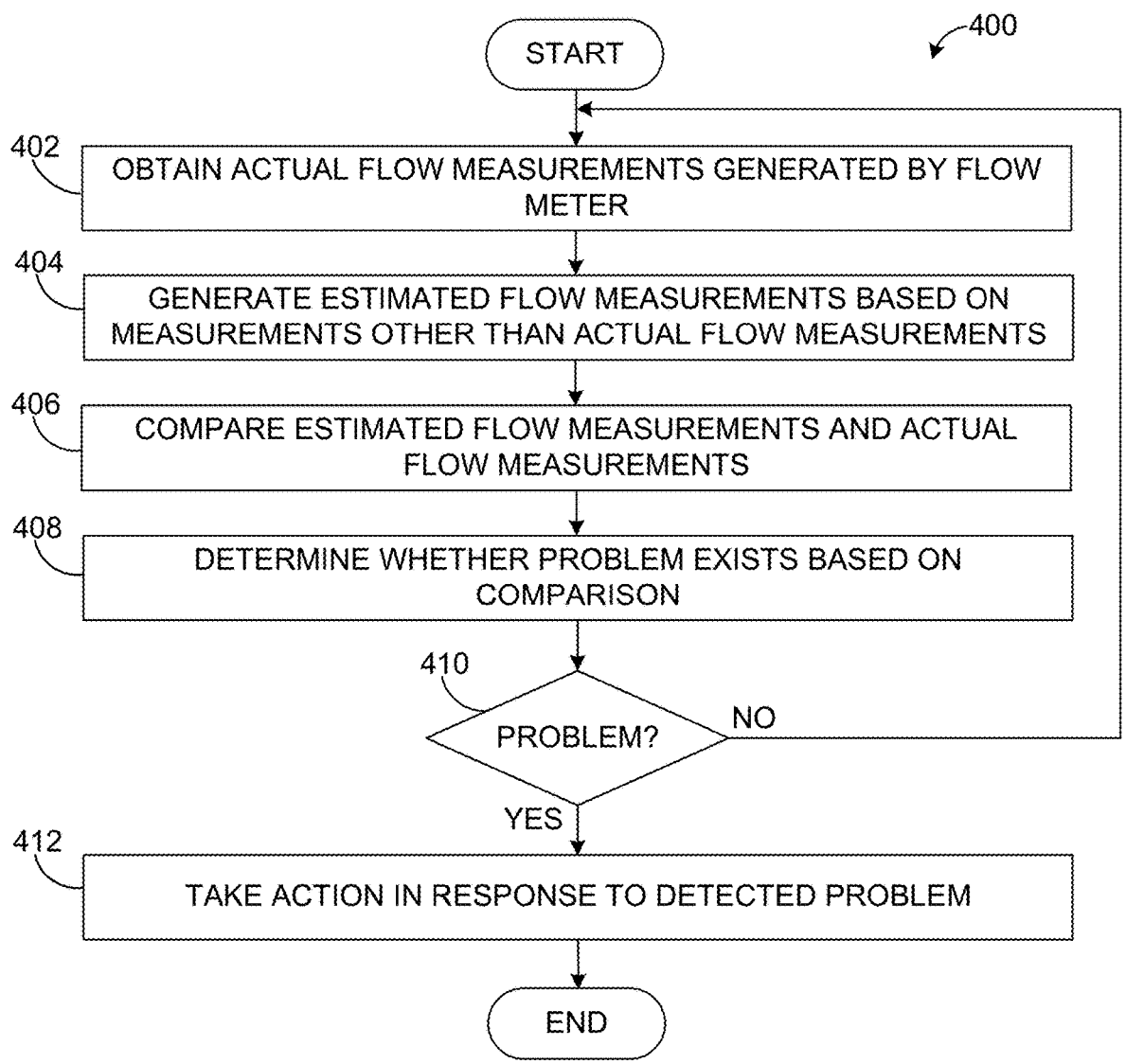
FIG. 4 illustrates an example method for creating inferential process flow measurements using other process measurements according to this disclosure.

FIG. 4 illustrates an example method 400 for creating inferential process flow measurements using other process measurements according to this disclosure. For ease of explanation, the method 400 is described as involving the use of the device 300 in FIG. 3 within the systems 100, 200 of FIGS. 1 and 2. However, the method 400 could involve the use of any suitable device in any suitable system.

As shown in FIG. 4, actual flow measurements generated by a flow meter are obtained at step 402. This could include, for example, the processor 302 obtaining actual flow measurements from one or more sensors 210. The actual flow measurements identify at least one flow of material in a passageway, such as the pipe 204. The actual flow measurements could be obtained at a specified interval, all at once, or at any other suitable time(s).

Estimated flow measurements are generated based on process variable measurements other than actual flow measurements at step 404. The other process variable measurements are non-flow measurements, meaning the other process variable measurements represent measurements of one or more process variables other than flow measurements. This could include, for example, the processor 302 obtaining other process variable measurements from one or more sensors 212-214. The one or more sensors 212-214 could be associated with a valve 202 in the passageway, be positioned within the passageway, and/or be positioned outside the passageway. As long as the other process variable measurements have some type of relationship to the flow of material through the passageway, the other process variable measurements can be used. This could also include the processor 302 using one or more models 216 to identify the estimated flow measurements. Each model 216 could associate one or more of the other process variables with estimated flow rates.

The estimated flow measurements and the actual flow measurements are compared at step 406, and a determination is made whether a problem exists based on the comparison at step 408. This could include, for example, the processor 302 determining if a mismatch exists between the estimated flow measurements and the actual flow measurements and, if so, whether the mismatch exceeds a threshold. The threshold could represent a threshold amount, a threshold percentage, or other threshold value. This could also include the processor 302 determining if the mismatch persists for a specified amount of time. The specified amount of time could encompass a single actual flow measurement or multiple actual flow measurements.

If it is determined at step 410 that no problem exists, the method 400 returns to step 402 in order to receive and process additional flow measurements. Otherwise, a problem may exist (either with the flow meter or some other component), and one or more actions can be taken in response to the problem at step 412. This could include, for example, the processor 302 generating a warning or an alarm for presentation to personnel (such as on one or more operator consoles 110) or scheduling equipment maintenance. This could also include the processor 302 updating one or more parameters that are used to generate the estimated flow measurements. This could further include the processor 302 using the estimated flow measurements in place of the actual flow measurements to control an industrial process. One or more other or additional actions could also occur.

Although FIG. 4 illustrates one example of a method 400 for creating inferential process flow measurements using other process measurements, various changes may be made to FIG. 4. For example, while shown as a series of steps, various steps in FIG. 4 could overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed.

For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   obtaining actual flow measurements generated by a flow meter, the actual flow measurements identifying a flow of material in a passageway, wherein the actual flow measurements are obtained at a specified interval, all at once or at another time;
   generating estimated flow measurements based on process variable measurements other than the actual flow measurements, wherein the process variable measurements other than the actual flow measurements comprise non-flow measurements that have a relationship to the flow of material in the passageway;
   comparing the estimated flow measurements and the actual flow measurements; and
   determining whether a problem exists based on the comparison.

2. The method of claim 1, wherein the process variable measurements comprise process variable measurements from one or more sensors associated with a flow restrictor in the passageway, wherein the flow restrictor comprises a structure having a fixed opening or a variable opening that is narrower than a surrounding structure, wherein the flow restrictor comprises at least one of a: flow orifice, an orifice plate and a pipe fitting.

3. The method of claim 1, wherein the process variable measurements comprise process variable measurements from one or more sensors positioned within the passageway.

4. The method of claim 1, wherein the process variable measurements comprise process variable measurements from one or more sensors positioned outside the passageway, wherein the one or more sensors comprises at least one of the following types of sensors: a mechanical sensor, an optical sensor, an open-channel sensor, a thermal mass sensor, a vortex sensor, a sonar sensor, an electromagnetic sensor, an ultrasonic sensor, a Coriolis sensor, and a laser Doppler flow meter.

5. The method of claim 1, wherein determining whether the problem exists comprises determining whether the estimated flow measurements differ from the actual flow measurements by a threshold percentage for a specified amount of time.

6. The method of claim 1, wherein generating the estimated flow measurements comprises using one or more models mathematically representing how the flow of material in the passageway relates to non-flow process variables associated with the process variable measurements.

7. The method of claim 1, further comprising, in response to determining that the problem exists, at least one of:
   generating a warning or an alarm;
   updating one or more parameters used to generate the estimated flow measurements; and
   using the estimated flow measurements in place of the actual flow measurements to control an industrial process.

8. An apparatus comprising:
   at least one processing device configured to:
      obtain actual flow measurements generated by a flow meter, the actual flow measurements identifying a flow of material in a passageway wherein the actual flow measurements are obtained at a specified interval, all at once or at another time;
      generate estimated flow measurements based on process variable measurements other than the actual flow measurements, wherein the process variable measurements other than the actual flow measurements comprise non-flow measurements that have a relationship to the flow of material in the passageway;
      compare the estimated flow measurements and the actual flow measurements; and
      determine whether a problem exists based on the comparison.

9. The apparatus of claim 8, wherein the process variable measurements comprise process variable measurements from one or more sensors associated with a flow restrictor in the passageway, wherein the flow restrictor comprises a structure having a fixed opening or a variable opening that is narrower than a surrounding structure, wherein the flow restrictor comprises at least one of a: flow orifice, an orifice plate and a pipe fitting.

10. The apparatus of claim 8, wherein the process variable measurements comprise process variable measurements from one or more sensors positioned within the passageway.

11. The apparatus of claim 8, wherein the process variable measurements comprise process variable measurements from one or more sensors positioned outside the passageway, wherein the one or more sensors comprises at least one of the following types of sensors: a mechanical sensor, an optical sensor, an open-channel sensor, a thermal mass sensor, a vortex sensor, a sonar sensor, an electromagnetic sensor, an ultrasonic sensor, a Coriolis sensor, and a laser Doppler flow meter.

12. The apparatus of claim 8, wherein, to determine whether the problem exists, the at least one processing device is configured to determine whether the estimated flow measurements differ from the actual flow measurements by a threshold percentage for a specified amount of time.

13. The apparatus of claim 8, wherein, to generate the estimated flow measurements, the at least one processing device is configured to use one or more models mathematically representing how the flow of material in the passageway relates to non-flow process variables associated with the process variable measurements.

14. The apparatus of claim 8, wherein the at least one processing device is further configured, in response to determining that the problem exists, to at least one of:
- generate a warning or an alarm;
- update one or more parameters used to generate the estimated flow measurements; and
- use the estimated flow measurements in place of the actual flow measurements to control an industrial process.

15. A non-transitory computer readable medium containing instructions that when executed cause at least one processing device to:
- obtain actual flow measurements generated by a flow meter, the actual flow measurements identifying a flow of material in a passageway wherein the actual flow measurements are obtained at a specified interval, all at once or at another time;
- generate estimated flow measurements based on process variable measurements other than the actual flow measurements, wherein the process variable measurements other than the actual flow measurements comprise non-flow measurements that have a relationship to the flow of material in the passageway;
- compare the estimated flow measurements and the actual flow measurements; and
- determine whether a problem exists based on the comparison.

16. The non-transitory computer readable medium of claim 15, wherein the process variable measurements comprise process variable measurements from one or more sensors positioned within the passageway.

17. The non-transitory computer readable medium of claim 15, wherein the process variable measurements comprise process variable measurements from one or more sensors positioned outside the passageway, wherein the one or more sensors comprises at least one of the following types of sensors: a mechanical sensor, an optical sensor, an open-channel sensor, a thermal mass sensor, a vortex sensor, a sonar sensor, an electromagnetic sensor, an ultrasonic sensor, a Coriolis sensor, and a laser Doppler flow meter.

18. The non-transitory computer readable medium of claim 15, wherein the instructions that when executed cause the at least one processing device to determine whether the problem exists comprise:
- instructions that when executed cause the at least one processing device to determine whether the estimated flow measurements differ from the actual flow measurements by a threshold percentage for a specified amount of time.

19. The non-transitory computer readable medium of claim 15, wherein the instructions that when executed cause the at least one processing device to generate the estimated flow measurements comprise:
- instructions that when executed cause the at least one processing device to use one or more models mathematically representing how the flow of material in the passageway relates to non-flow process variables associated with the process variable measurements.

20. The non-transitory computer readable medium of claim 15, further containing instructions that when executed cause the at least one processing device, in response to determining that the problem exists, to at least one of:
- generate a warning or an alarm;
- update one or more parameters used to generate the estimated flow measurements; and
- use the estimated flow measurements in place of the actual flow measurements to control an industrial process.

* * * * *